United States Patent
Miyamoto et al.

(10) Patent No.: US 10,453,068 B2
(45) Date of Patent: *Oct. 22, 2019

(54) TOKENIZATION CORRESPONDING TO PAYMENT PROFILE MIGRATION

(71) Applicant: PAYPAL, INC., San Jose, CA (US)

(72) Inventors: Alex Miyamoto, San Jose, CA (US); Chandra Sivakolundu, Pleasanton, CA (US); Jot Powers, San Jose, CA (US); Shirish Kandekar, San Jose, CA (US)

(73) Assignee: PayPal, Inc., San Jose, CA (US)

(*) Notice: Subject to any disclaimer, the term of this patent is extended or adjusted under 35 U.S.C. 154(b) by 596 days.

This patent is subject to a terminal disclaimer.

(21) Appl. No.: 15/197,498

(22) Filed: Jun. 29, 2016

(65) Prior Publication Data

US 2018/0005236 A1    Jan. 4, 2018

(51) Int. Cl.
*G06Q 20/40* (2012.01)
*G06Q 20/10* (2012.01)
*G06Q 20/08* (2012.01)

(52) U.S. Cl.
CPC ....... *G06Q 20/409* (2013.01); *G06Q 20/0855* (2013.01); *G06Q 20/10* (2013.01); *G06Q 20/102* (2013.01)

(58) Field of Classification Search
CPC .............. G06Q 20/102; G06Q 20/409; G06Q 20/0855; G06Q 20/10
See application file for complete search history.

(56) References Cited

U.S. PATENT DOCUMENTS

| | | | | |
|---|---|---|---|---|
| 5,920,847 | A * | 7/1999 | Kolling | G06Q 20/02 705/40 |
| 2005/0077350 | A1* | 4/2005 | Courtion | G06Q 20/10 235/380 |
| 2006/0116949 | A1* | 6/2006 | Wehunt | G06Q 10/00 705/35 |
| 2007/0100913 | A1* | 5/2007 | Sumner | G06F 11/1453 |
| 2007/0198402 | A1* | 8/2007 | Ruttenberg | G06Q 20/10 705/39 |
| 2011/0125634 | A1* | 5/2011 | Monk | G06Q 20/10 705/39 |
| 2011/0295925 | A1* | 12/2011 | Lieblich | G06F 9/5027 709/202 |
| 2014/0047124 | A1* | 2/2014 | Simcoe | H04L 67/06 709/232 |
| 2015/0154569 | A1* | 6/2015 | Johnston | G06Q 20/10 705/44 |
| 2016/0180302 | A1* | 6/2016 | Bagot, Jr. | G06Q 20/027 705/40 |

* cited by examiner

*Primary Examiner* — Seung H Lee
(74) *Attorney, Agent, or Firm* — Haynes and Boone LLP

(57) ABSTRACT

A system may perform operations that include receiving, by a migration service provider computer that includes one or more hardware processors, a first set of payment profiles that are stored on a third-party service provider computer according to a first file format. The first set of payment profiles may be associated with a first set of payment tokens corresponding to the third-party service provider computer. The operations may include executing a profile migration to generate, based on a second file format that is different from the first file format, a new set of payment profiles corresponding to the first set of payment profiles. The operations may also include removing the first payment token from the system and generating a new set of payment tokens corresponding to the new set of payment profiles.

20 Claims, 7 Drawing Sheets

TOKENIZATION CORRESPONDING TO PAYMENT PROFILE MIGRATION

BACKGROUND

A merchant may use a payment processor provided by a third-party service provider to processor payments by various customers of the merchant. The third-party service provider may also store a set of payment profiles (e.g., credit card information, automatic clearing house information, bank information, user contact information, billing address, etc.) corresponding to the customers. The set of payment profiles may be stored by the third-party service provider according to a first file format. In certain instances, the merchant may wish to use a different service provider than the third-party service provider, and may desire to migrate the set of payment profiles from the third-party service provider to the other service provider, which in some cases may tore payment profiles according to a second file format that is different from the first file format.

Figure 1:
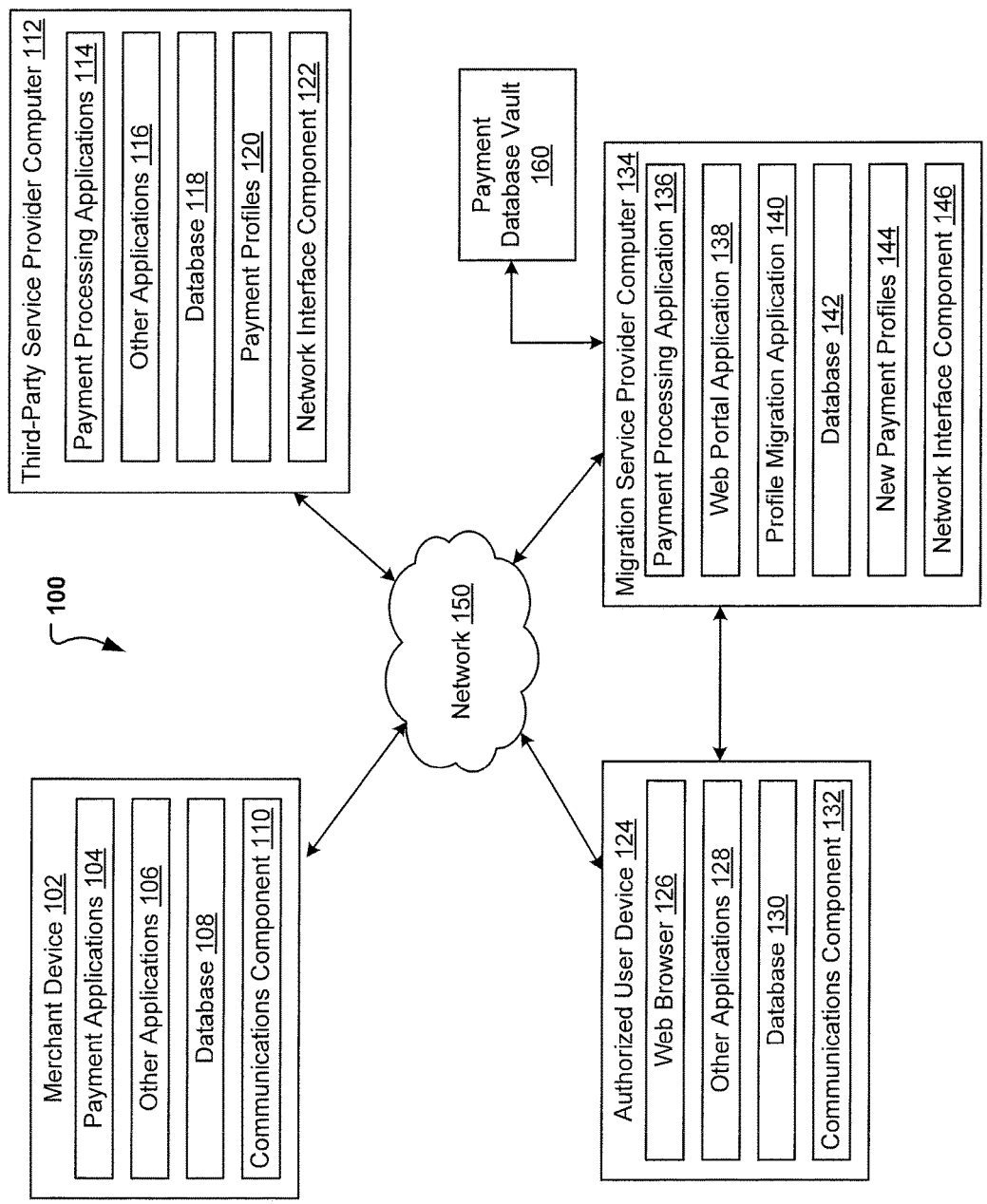
FIG. 1 is a block diagram of a networked system suitable for implementing the processes described herein for payment profile migration, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Systems and methods are provided for payment profile migration. In a particular embodiment, a system includes a merchant device, a migration service provider computer of a migration service provider, and a third-party service provider computer of a third-party service provider. The migration service provider may be a payment service provider that processes payment transactions between merchants and customers. The third-party service provider may be a different payment service provider that also processes payment transactions between merchants and customers. The merchant device, the third-party service provider computer, and the migration service provider computer may be in communication with each other via a network. The merchant device may facilitate financial transactions associated with goods or services sold by a merchant and purchased by one or more customers of the merchant.

According to certain embodiments, the merchant may have an account and/or relationship with the third-party service provider. Thus, the merchant device may have communicated with the third-party service provider computer to process payment transactions for past sales of the goods or services. The third-party service provider computer may store a set of payment profiles related to the past payment transactions between the merchant and the one or more customers. For instance, a particular payment profile from the set of payment profiles may include payment information corresponding to a particular customer of the merchant. The payment information may include credit card information (e.g., card number, expiration date, security code, card issuer, and/or the like), Automated Clearing House (ACH) information (e.g., account number, routing number, and/or the like), billing information, customer identification information (e.g., a customer identifier, name, address, phone number, date of birth, and/or the like), and/or any other type of payment information related to a financial account associated with the particular customer.

The third-party service provider may also store a set of payment tokens corresponding to the set of payment profiles. For example, each payment profile of the set of payment profiles may be associated with a corresponding payment token from the set of payment tokens. In some embodiments, each payment profile may include a corresponding payment token from the set of payment tokens. The third-party service provider may use the set of payment tokens for security purposes when processing payment transactions to hide payment information included in the set of payment profiles. The set of payment tokens may be particular to the third-party service provider computer (e.g., computers from other service providers may be unable to use the set of payment tokens) and may enable the merchant device to more securely process payment transactions. For example, in order to process a payment transaction that involves a credit card number associated with a particular payment profile, the third-party service provider computer may provide the merchant device with a particular payment token that is different from the credit card number. The merchant device may use the particular payment token to process the payment transaction instead of the credit card number. Further, the merchant device may store and associate the particular payment token with the particular payment profile instead of the credit card number, thereby protecting the credit card number from being stolen in a potential security breach of the merchant device.

In addition, the third-party service provider computer may store the set of payment profiles according to a first file format, such as in a comma-separate values (.csv) file format, a JavaScript Object Notation (.json) file format, a markup language format (e.g., extensible markup language (.xml)), a tab-separated values file format (.tsv), and/or any other file format.

In a particular embodiment, the merchant may wish to switch from the third-party service provider to a different service provider (e.g., the migration service provider) to process future payment transactions. As such, the merchant (e.g., via the merchant device) may communicate with an authorized user device to initiate a profile migration. In response, the authorized user device communicates with the migration service provider computer to transfer the set of payment profiles stored by the third-party service provider computer to the migration service provider computer. In addition, the set of payment tokens may also be transferred to the migration service provider computer. In certain implementations, set of payment profiles may include the set of payment tokens. Further, the migration service provider computer may be configured to store payment profiles according to a second file format that is different from the first file format. Thus, as part of the profile migration, the migration service provider computer generates, according to the second file format, a new set of payment profiles that correspond to the set of payment profiles stored on the third-party service provider computer. As a result, payment information included in each of the new set of payment profiles may correspond to payment information included in one or more of the set of payment profiles transferred from the third-party service provider computer. For example, a particular payment profile of the set of payment profiles transferred from the third-party service provider computer may include particular payment information corresponding to a user named "John Doe" and a credit card number of "1234". During the profile migration process, the migration service provider computer may generate, according to the second file format, a new payment profile that corresponds to the particular payment profile. The new payment profile includes payment information that also corresponds to the user name "John Doe" and the credit card number "1234". In addition to generating the new set of payment profiles, the migration service provider computer may also generate a new set of payment tokens corresponding to the new set of payment profiles. The new set of payment tokens may be particular to the migration service provider computer (e.g., computers from other service providers may be unable to use the set of payment tokens) and may enable the merchant device to more securely process payment transactions using the migration service provider computer. Further, the migration service provider computer may transmit the new set of payment tokens to the merchant device.

Moreover, the first file format may be associated with a first set of data fields, and the second file format may be associated with a second set of data fields that are is different from the first set of data fields. Because the second file format is different from the first file format, a mapping is generated between the first set of data fields the second set of data fields. According to a particular embodiment, the migration service provider computer generates the mapping. In another embodiment, the authorized user device is configured to generate the mapping (e.g., via input from a user of the authorized user device) and to transmit the mapping to the migration service provider computer. For example, a first data field of the first set of data fields may be labeled "CC NUM" and a second data field of the second set of data fields may be labeled "Card #". The migration service provider computer may determine that both the first data field and the second data field correspond to credit card numbers and map the first data field to the second data field accordingly. It will be appreciated that the mapping described above is merely illustrative and that any algorithm for mapping and any number of mappings between data fields of the first set of data fields and data fields of the second set of data fields are also contemplated.

During the profile migration, the migration service provider computer analyzes each payment profile of the set of payment profiles transferred from the third-party service provider computer. For example, the migration service provider computer may identify a particular payment profile from the set of payment profiles. The migration service provider computer may extract payment information and/or a particular token from the particular payment profile. Based on the extracted payment information, the migration service provider computer may perform a payment transaction test, in which the extracted payment information is verified and authorized (e.g., checked for accuracy, compliance with the Office of Foreign Assets Control (OFAC) regulations, and/or the like). In certain implementations, the payment transaction test may correspond to a zero dollar authorization. As used herein, a zero dollar authorization may be performed to validate payment information associated with a credit card (e.g., or other financial instrument) by charging a zero dollar amount to the credit card. If the payment transaction test is successful, the migration service provider computer may generate, according to the second file format, a new payment profile corresponding to the particular payment profile. The new payment profile may include new payment information that corresponds to the extracted payment information from the particular payment profile. The migration service provider computer may also generate a new token corresponding to the new payment profile and remove the particular token. The migration service provider computer may then identify the next payment profile in the set of payment profiles and perform the same process with respect to the next payment profile.

If the payment transaction test results in a test fail, the migration service provider computer may generate an error indication and communicate the error indication to the authorized user device. In a particular embodiment, the profile migration may be paused in response to the test fail, and may be resumed upon an indication and/or instructions to resume provided by the authorized user device. In another embodiment, in response to test fail, the migration service provider computer may continue the profile migration with respect to the remaining payment profiles in the set of payment profiles without generating a new payment profile corresponding to the particular payment profile.

In some embodiments, in addition to the payment transaction test performed with respect to each payment profile in the set of payment profiles, the migration service provider computer may also determine whether each payment profile corresponds to a security and/or compliance risk. For example, the migration service provider computer may determine a security risk level for the particular payment profile based on credit information associated with the particular payment profile (e.g., credit reports, credit scores, criminal history, and/or the like). In other examples, determination that a particular payment profile corresponds to an account that has been compromised may be accomplished by analyzing information, such as data from databases, data received from querying various sources, and/or data obtained by scraping publicly available information. Compromised accounts may, for example, in various embodiments correspond to accounts that have been subject to a security breach, accounts that have been subject to data privacy violations, or accounts that are determined to be utilized for improper means.

In a particular implementation, if the migration service provider computer determines that the security risk level is greater than a security risk level threshold, the migration service provider computer may pause the profile migration. In such a way, present embodiments may prevent migration of accounts that may bring unwanted liability to the migration service provider. The migration service provider computer may generate a security risk indication and transmit the indication to the authorized user computer. The profile migration may remain paused until the migration service provider computer receives an indication (e.g., from the authorized user computer) to resume the profile migration. In another implementation, in response to the security risk level associated with the particular payment profile being greater than the security risk threshold, the migration service provider computer may automatically continue the profile migration with respect to the remaining payment profiles in the set of payment profiles without generating a new payment profile corresponding to the particular payment profile.

By executing the profile migration, the migration service provider computer generates a new set of payment profiles that correspond to the set of payment profiles transferred from the third-party service provider computer, where each of the new set of payment profiles corresponds to the second file format. During the profile migration, the migration service provider computer may also be configured to determine progress information corresponding to a progress of the profile migration. The migration service provider computer may transmit the progress information to the authorized user computer, which may cause the authorized user computer to display the progress information. Furthermore, the authorized user computer may transmit, to the migration service provider computer, profile migration instructions (e.g., in response to one or more inputs by an authorized user of the authorized user computer) to pause, resume, and/or cancel the profile migration at any time during the profile migration. The profile migration instructions may cause the migration service provider computer to pause, resume, and/or cancel the profile migration accordingly.

According to certain embodiments, the migration service provider computer may store the new set of payment profiles in a payment database vault that is separate from (e.g., not included in) the migration service provider computer. For example, the payment database vault may be off-site from the migration service provider computer. In certain implementations, the new set of payment profiles may be stored in the payment database vault as part of successful payment transaction tests (e.g., successful zero dollar authorizations). Upon completion of the profile migration, the migration service provider computer may delete, discard, and/or otherwise remove transitional data corresponding to the new set of payment profiles. Transitional data may include copies of the new set of payment profiles and/or the new set of payment tokens. The transitional data may also include any information corresponding to the new set of payment profiles, the new set of payment tokens, and/or portions thereof (e.g., payment information, metadata, token information, etc.).

In various embodiments, the migration service provider may provide services to users of the migration service provider, as well as other entities requesting additional services, such as account providers (e.g., other service providers, financial institutions, online social networks, media sharing services, and other types of services where a user may utilize an account with the migration service provider). The migration service provider may provide account services to the user, where the user may establish and maintain an account to utilize services of the migration service provider. For example, the migration service provider may provide payment processing, monetary transfer, and other financial services to merchants, consumers, and other users, which may be utilized through one or more applications executing on a user device of the user (e.g., browser/dedicated application) and an account of the user with the migration service provider. The migration service provider may further include additional transaction management services accessible through a device application, such as a browser application, dedicated application of the migration service provider, and/or other application (e.g., an application on the merchant device) utilizing the processes and features provided by the migration service provider. Accounts with the migration service provider may correspond to user accounts, where a holder of the account may utilize services of the migration service provider through the account. The accounts of users may include personal, device, and financial information, as well as other information that may be determined by or requested from the migration service provider. Additionally, the user may specify authentication credentials, such as a login name, password, and/or personal identification number (PIN) for use of the account. The authentication credentials may allow the user to verify their identity and/or access the account, for example, through a universally unique identifier, token, password, PIN, or other identifier.

FIG. 1 is a block diagram of a networked system 100 for implementing the processes described herein, according to an embodiment. As shown, system 100 may include or implement a plurality of devices, computers, servers, and/or software components that operate to perform various methodologies in accordance with the described embodiments. Exemplary devices, computers, and servers may include mobile devices, stand-alone devices, desktop computers, laptop computers, and enterprise-class servers, executing an operating system (OS) such as a MICROSOFT® OS, a UNIX® OS, a LINUX® OS, or another suitable device and/or server based OS. It will be appreciated that the devices, computers, and/or servers illustrated in FIG. 1 may be deployed differently and that the operations performed and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 100 includes a merchant device 102, an authorized user device 124, a third-party service provider computer 112, and a migration service provider computer 134 in communication over a network 150. The merchant device 102, authorized user device 124, third-party service provider computer 112, and the migration service provider computer 134 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 100, and/or accessible over network 150.

The merchant device 102 may be implemented as a communication device that may utilize appropriate hardware and software configured for wired and/or wireless communication with the authorized user device 124, third-party service provider computer 112, and/or migration service provider computer 134. For example, in one embodiment, the merchant device 102 may be implemented as a personal computer (PC), a smart phone, laptop/tablet computer, point-of-sale device, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APAYMENT PROFILELE®. The merchant device 102 may correspond to and be utilized by a first user, such as an employee of a merchant and/or another person authorized by the merchant. Although only one merchant device 102 is shown, a plurality of merchant devices may function similarly.

The merchant device 102 may include one or more payment applications 104, other applications 106, a database 108, and a communications component 110. The payment applications 104 and other applications 106 may correspond to executable processes, procedures, and/or applications with associated hardware. In other embodiments, merchant device 102 may include additional or different components having specialized hardware and/or software to perform operations associated with the payment applications 104 and/or the other applications 106.

The payment application 104 may facilitate financial transactions corresponding to the sale of goods and/or services offered by the merchant. For example, the payment application 104 may provide an interface for customers to purchase the goods or services and to receive customer payment information (e.g., customer credit card information). The payment application 104 may further transmit customer payment information to a payment processor (e.g., such as a payment processor corresponding to the third-party service provider computer 112 or the migration service provider computer 134) to process the customer payment information. The payment application 104 may also facilitate other types of financial transactions such as banking, online payments, money transfer, and/or the like.

The merchant device 102 may execute the other applications 106 to perform various other tasks and/or operations corresponding to the merchant device 102. For example, the other applications 106 may include security applications for implementing client-side security features, programmatic client applications for interfacing with appropriate application programming interfaces (APIs) over network 150, or other types of applications. The other applications 106 may also include additional communication applications, such as email, texting, voice, and instant messaging (IM) applications that enable a user to send and receive emails, calls, texts, and other notifications through the network 150. In various embodiments, the other applications 106 may include location detection applications, such as a mapping, compass, and/or global positioning system (GPS) applications, which may be used to determine a location of the merchant device 102. The other applications may 106 include social networking applications. Additionally, the other applications 106 may include device interfaces and other display modules that may receive input and/or output information. For example, the other applications 106 may include a graphical user interface (GUI) configured to provide an interface to the user.

The merchant device 102 may further include a database 108, which may be stored in a memory and/or other storage device of the merchant device 102. The database 108 may include, for example, identifiers (IDs) such as operating system registry entries, cookies associated with the payment application 104 and/or other applications 106, IDs associated with hardware of the communication component 110, IDs used for payment/user/device authentication or identification, and/or other appropriate IDs. The database 108 may also include information corresponding to one or purchase transactions of customers who have purchased goods or services from the merchant, browsing histories of the customers, or other types of customer information. In certain embodiments, the merchant device 102 may also include information corresponding to payment tokens, such as payment tokens generated by the third-party service provider computer 112 and/or generated by the migration service provider computer 134.

The merchant device 102 may also include at least one communication component 110 configured to communicate with various other devices such as the authorized user device 124, the third-party service provider computer 112, and/or the migration service provider computer 134. In various embodiments, communication component 110 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, BLUETOOTH®, BLUETOOTH LOW-ENERGY®, near field communication (NFC) devices, and/or the like.

The third-party service provider computer 112 may be maintained, for example, by a third-party service provider, which may provide payment processing services for the merchant. As such, the third-party service provider computer 112 includes one or more payment processing applications 114, which may be configured to process payment information received from the merchant device 102. For example, the payment application 104 of the merchant device 102 may receive payment information from a customer to purchase a service or good offered by the merchant. Upon receipt of the payment information, the payment application 104 may transmit the payment information to the third-party service provider computer 112. The payment processing application 114 of the third-party service provider computer 112 may receive and process the payment information.

The third-party service provider computer 112 may execute the other applications 116 to perform various other tasks and/or operations corresponding to the third-party service provider computer 112. For example, the other applications 116 may include security applications for implementing client-side security features, programmatic client applications for interfacing with appropriate APIs over the network 150, or other types of applications. The other applications 116 may also include additional communication applications, such as email, texting, voice, and IM applications that enable communication of emails, calls, texts, and other notifications through the network 150. In various embodiments, the other applications 116 may include location detection applications, such as a mapping, compass, and/or GPS applications, which may be used to determine a location of the third-party service provider computer 112. The other applications 116 may include social networking applications. Additionally, the other applications 116 may include device interfaces and other display modules that may receive input and/or output information. For example, the other applications 116 may include a GUI configured to provide an interface to one or more users.

The third-party service provider computer 112 may further include a database 118, which may be stored in a memory and/or other storage device of the third-party service provider computer 112. The database 118 may include, for example, IDs such as operating system registry entries, cookies associated with the payment processing application 114 and/or other the applications 116, IDs associated with hardware of the network interface component 122, IDs used for payment/user/device authentication or identification, and/or other appropriate IDs.

According to a particular embodiment, the third-party service provider computer 112 may include a set of payment profiles 120 corresponding to past sales transactions executed by the merchant device 102 with respect to one or more customers of the merchant. For example, a particular payment profile from the set of payment profiles 120 may include payment information corresponding to a particular customer of the merchant. The payment information may include credit card information (e.g., card number, expiration date, security code, card issuer, and/or the like), Automated Clearing House (ACH) information (e.g., account number, routing number, and/or the like), identification information associated with the particular customer (e.g., a customer identifier, name, address, phone number, date of birth, and/or the like), billing information, and/or any other type of payment information associated with the particular customer. Furthermore, other payment profiles of the set of payment profiles 120 may include payment information corresponding to other customers of the merchant. In addition, the third-party service provider computer 112 may store the set of payment profiles 120 according to a first file format.

The third-party service provider computer 112 may also store a set of payment tokens corresponding to the set of payment profiles 120. For example, each payment profile of the set of payment profiles 120 may be associated with a corresponding payment token from the set of payment tokens. In some embodiments, each payment profile may include a corresponding payment token from the set of payment tokens. The set of payment tokens may be particular to the third-party service provider computer 112 (e.g., computers from other service providers may be unable to use the set of payment tokens) and may enable the merchant device 102 to more securely process payment transactions with the third-party service provider computer 112. For example, in order to process a payment transaction that involves a credit card number associated with a particular payment profile, the third-party service provider computer 112 may provide the merchant device 102 with a particular payment token that is different from the credit card number. The merchant device 102 may use the particular payment token to process the payment transaction instead of the credit card number. Further, the merchant device may store and associate the particular payment token with the particular payment profile instead of the credit card number, thereby protecting the credit card number from being stolen in a potential security breach of the merchant device 102.

In various embodiments, the third-party service provider computer 112 also includes at least one network interface component 122 that is configured to communicate with the merchant device 102, the authorized user device 124, and/or the migration service provider computer 134 via the network 150. For example, according to a particular embodiment, the third-party service provider computer 112 may transmit the set of payment profiles 120 to the migration service provider computer 134 via the network interface component 122, as described in further detail below. Further, the network interface component 122 may comprise a DSL modem, a PSTN modem, an Ethernet device, a broadband device, a satellite device and/or various other types of wired and/or wireless network communication devices including microwave, RF, and IR communication devices.

The authorized user device 124 may be implemented as a communication device that may utilize appropriate hardware and software configured for wired and/or wireless communication with the merchant device 102, third-party service provider computer 112, and/or migration service provider computer 134. For example, in one embodiment, the authorized user device 124 may be implemented as a personal computer (PC), a smart phone, laptop/tablet computer, point-of-sale device, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APAYMENT PROFILELE®. According to a particular embodiment, the authorized user device 124 may correspond to and be utilized by an authorized user of the service provider. As described further below, the authorized user device 124 may communicate with the merchant device 102 and the migration service provider computer 134 to initiate a profile migration to transfer the set of payment profiles 120 from the third-party service provider computer 112 to the migration service provider computer 134. Although only one authorized user device 124 is shown, the system 100 may include a plurality of authorized user devices.

The authorized user device 124 may include a web browser 126, which may be configured, via one or more inputs by the authorized user, to navigate to one or more websites and/or webpages. In certain implementations, the authorized user device 124 (e.g., via inputs by the authorized user) may interface with the migration service provider computer 134 via the web browser 126. For example, the web browser 126 may be used to navigate to a webpage served by the migration service provider computer 134 and to provide one or more inputs and/or profile migration instructions to the migration service provider computer 134. The profile migration instructions may control certain aspects of the profile migration including, but not limited to, pausing the profile migration, resuming the profile migration, generating a report based on the profile migration, and canceling and/or stopping the profile migration. For example, in response the receiving an error indication with respect to a profile migration executed by the migration service provider computer 134, the authorized user device 124 may cause (e.g., automatically and/or via a selected action input by the authorized user) the migration service provider computer 134 to pause the profile migration. The authorized user device 124 may then resolve the error indication, such as by causing the migration service provider computer 134 to remove one or more new payment profiles that have generated, by receiving payment information manually input by authorized user, and/or any other action. Upon resolving the error indication, the authorized user device 124 may cause (e.g., automatically and/or via another selected action input by the authorized user) the migration service provider computer 134 to resume the profile migration.

The authorized user device 124 may execute the other applications 128 to perform various other tasks and/or operations corresponding to the authorized user device 124. For example, the other applications 128 may facilitate communication with the merchant device 102, such as to receive an indication, from the merchant device 102, to switch payment processing services from the third-party service provider to the service provider. As another example, the other applications 128 may include security applications for implementing client-side security features, programmatic client applications for interfacing with appropriate APIs over the network 150, or other types of applications. The other applications 128 may also include additional communication applications, such as email, texting, voice, and IM applications that enable communication of emails, calls, texts, and other notifications through the network 150. In various embodiments, the other applications 128 may include location detection applications, such as a mapping, compass, and/or GPS applications, which may be used to determine a location of the authorized user device 124. The other applications may 128 social networking applications. Additionally, the other applications 128 may include device interfaces and other display modules that may receive input and/or output information. For example, the other applications 128 may include a GUI configured to provide an interface to one or more users.

The authorized user device 124 may further include a database 130, which may be stored in a memory and/or other storage device of the authorized user device 124. The database 130 may include, for example, identifiers (IDs) such as operating system registry entries, cookies associated with the web browser 126 and/or the other applications 128, IDs associated with hardware of the communication component 132, IDs used for payment/user/device authentication or identification, and/or other appropriate IDs.

The authorized user device 124 may also include at least one communication component 110 configured to communicate with various other devices such as the merchant device 102, the third-party service provider computer 112, and/or the migration service provider computer 134. In various embodiments, communication component 110 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, BLUETOOTH®, BLUETOOTH LOW-ENERGY®, near field communication (NFC) devices, and/or the like.

The migration service provider computer 134 may be maintained, for example, by a service provider, which may provide payment processing services for the merchant. In one example, the migration service provider computer 134 may be provided by PAYPAL®, Inc. of San Jose, Calif., USA. However, in other embodiments, the migration service provider computer 134 may be maintained by or include a financial service provider, social networking service, email or messaging service, media sharing service, and/or other service provider, which may provide payment processing services. The migration service provider computer 134 includes one or more payment processing applications 136, which may be configured to process payment information received from the merchant device 102. For example, the payment application 104 of the merchant device 102 may receive payment information from a customer to purchase a service or good offered by the merchant. Upon receipt of the payment information, the payment application 104 may transmit the payment information to the migration service provider computer 134. The payment processing application 136 of the migration service provider computer 134 may receive and process the payment information.

The migration service provider computer 134 may also include a web portal application 138 and a profile migration application 140 to facilitate a migration of the set of payment profiles 120 from the third-party service provider computer 112 to the migration service provider computer 134. The web portal application 138 communicates with the web browser 126 of the authorized user device 124 to control one or more aspects of the profile migration application 140. For example, the web portal application 138 may receive an indication, transmitted by the web browser 126, to initiate a profile migration of the set of payment profiles 120 from the third-party service provider computer 112 to the migration service provider computer 134. The web portal application 138 may provide the indication to the profile migration application 140, and in response, the profile migration application 140 may initiate the profile migration. According to certain embodiments, the profile migration application 140 may be configured as a background application (e.g., a daemon) that monitors and/or checks for the indication at predetermined time intervals. In response to detecting the indication, the profile migration application 140 initiates the profile migration.

As part of executing the profile migration, the profile migration application 140 may download the set of payment profiles 120 from the third-party service provider computer 112. As previously discussed, each payment profile of set of the payment profiles 120 may correspond to a first file format. Further, the migration service provider computer 134 may generate and/or store payment profiles according to a second file format that is different from the first file format. In certain implementations, the migration service provider computer 134 may generate/store payment profiles according to the second file format because the payment processing application 136 may be configured to process information according to the second file format. Since the second file format is different from the first file format, in order to execute the profile migration, the profile migration application 140 may generate a new set of payment profiles 144 that corresponds to the set of payment profiles 120 downloaded from the third-party service provider computer 112. Each payment profile of the new set of payment profiles 144 may correspond to a particular payment profile from the set of payment profiles 120 downloaded from the third-party service provider computer 112.

Further, the first file format may be associated with a first set of data fields. Each data field of the first set of data fields may correspond to different types of payment information. Thus, each payment profile of the set of payment profiles 120 may include payment information that is categorized by one or more data fields of the first set of data fields. For instance, a particular payment profile from the set of payment profiles 120 may include particular payment information. The particular payment information may include credit card information such as account number, routing number, expiration date, name, card issuer, and a security code. Each of the account number, routing number, expiration date, name, card issuer, and a security code may be associated with a corresponding data field from the first set of data fields. It will be appreciated that the provided credit card information is merely exemplary, and that other types of credit card information are also contemplated. Further, as previously discussed, other types of information may also be included in the particular payment information, such as ACH information, bank information, and/or the like. Additionally, the first file format may include any type of file format including, but not limited to, a comma-separate values (.csv) file format, a JavaScript Object Notation (.json) file format, a markup language format (e.g., extensible markup language (.xml)), and/or a tab-separated values file format (.tsv).

Additionally, the second file format may be associated with a second set of data fields. Thus, each payment profile that is generated and/or stored according to the second file format includes payment information that is categorized by one or more of data fields of the second set of data fields. The second set of data fields may be different from the first set of data fields. Further, the second file format may include any type of file format including, but not limited to, a comma-separate values (.csv) file format, a JavaScript Object Notation (.json) file format, a markup language format (e.g., extensible markup language (.xml)), and/or a tab-separated values file format (.tsv). According to a particular embodiment, the second set of data fields may categorize payment information similarly to the first set of data fields, but the second set of data fields may be labeled differently from the first set of data fields. Accordingly, as described in more detail below, the profile migration application 140 may generate the new set of payment profiles 144 based on a mapping between the first set of data fields and the second set of data fields.

Figure 2:
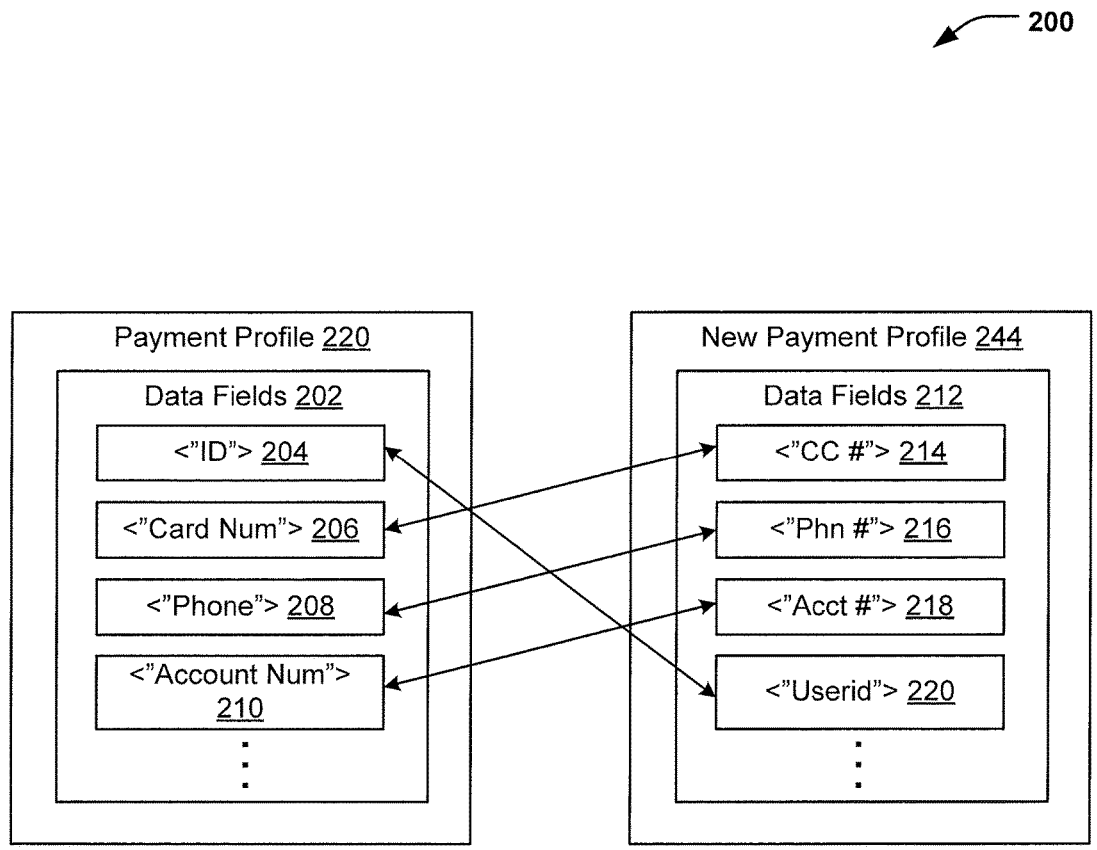
FIG. 2 is an exemplary diagram of a mapping between data fields of different payment profiles, according to an embodiment.

For instance, FIG. 2 depicts a diagram of a mapping 200 between data fields of two example payment profiles. As illustrated in FIG. 2, a payment profile 220 may include multiple data fields 202, such as an "ID" data field 204, a "Card Num" data field 206, a "Phone" data field 208, and an "Account Num" data field 210. Further, a new payment profile 244 includes multiple data fields 212, such as a "CC" data field 214, a "Phn #" data field 216, an "Acct #" data field 218, and a "Userid" data field 220. The payment profile 220 may be associated with a file format that is different than a file format associated with the new payment profile 244.

According to a particular embodiment, the payment profile 220 may be associated with the first file format, and the new payment profile 244 may be associated with the second file format. The mapping 200 may indicate how the data fields 202 of the payment profile 220 correspond to the data fields 212 of the new payment profile 244. For instance, the "ID" data field 204 of the payment profile 220 may correspond to the "Userid" data field 220 of the new payment profile 244. Both the "ID" data field 204 and the "Userid" data field 220 may be used to categorize payment information that corresponds to a user identifier. The "Card Num" data field 206 of the payment profile 220 may correspond to the "CC #" data field 214 of the new payment profile 244. Both the "Card Num" data field 206 and the "CC #" data field 214 may be used to categorize payment information that corresponds to a credit card number. The "Phone" data field 208 of the payment profile 220 may correspond to the "Phn #" data field 216 of the new payment profile 244. Both the "Phone" data field 208 and the "Phn #" data field 216 may be used to categorize payment information that corresponds to a phone number. The "Account Num" data field 210 of the payment profile 220 may correspond to the "Acct #" data field 218 of the new payment profile 244. Both the "Account Num" data field 210 and the "Acct #" data field 218 may be used to categorize payment information that corresponds to a bank account number.

It will be appreciated that each of the data fields 202 of the payment profile 220 and the data fields 212 of the new payment profile 244 may include more or fewer data fields than illustrated. Moreover, the mapping 200 may provide correspondences between any number and any type of data fields of respective payment profiles of different file formats.

Referring back to FIG. 1, the profile migration application 140 may access or otherwise be provided a mapping (e.g., the mapping 200 of FIG. 2) between the first set of data fields of the first file format and the second set of data fields of the second file format. For example, the mapping may be stored in the database 142 and/or another storage device associated with the migration service provider computer 134. As another example, the authorized user device 124 may provide the mapping to the profile migration application 140 via the web portal application 138. According to other embodiments, the profile migration application 140 may be configured to generate the mapping based on analyzing relationships between the first set of data fields and the payment information stored in the set of payment profiles 120. For example, with reference to FIG. 2, the profile migration application 140 may determine that payment information that is tagged and/or otherwise associated with the "Card Num" data field 206 include a number that is sixteen digits and length. As a result, the profile migration application 140 may determine that the "Card Num" data field 206 is used to categorize credit card numbers. Hence, the profile migration application 140 may generate a mapping between the "Card Num" data field 206 of the first file format with the "CC #" data field 214 of the second file format. It will be appreciated that the above mapping is merely exemplary, and that the profile migration application 140 may perform various algorithms and tests to generate a mapping between the first set of data fields and the second set of data fields.

As previously discussed, the profile migration application 140 may generate the set of new payment profiles 144 based on the mapping. To this end, the profile migration application 140 may analyze each payment profile of the set of payment profiles 120 to determine whether to generate a corresponding new payment profile according to the second file format. For example, the profile migration application 140 may identify a particular payment profile from the set of payment profiles. The profile migration application 140 extracts payment information from the particular payment profile. Based on the extracted payment information, the profile migration application 140 performs a payment transaction test, in which the extracted payment information is verified and authorized (e.g., checked for accuracy, compliance with the Office of Foreign Assets Control (OFAC) regulations, and/or the like). According to a particular embodiment, the extracted payment information corresponds to credit card information associated with a credit card, and the payment transaction test corresponds to a zero dollar authorization. The profile migration application 140 may execute the zero dollar authorization to validate the extracted credit card information by charging a zero dollar amount to the credit card using the extracted credit card information. A successful charge of the zero dollar amount may indicate a test pass for the zero dollar authorization. Otherwise, if any errors are determined via the zero dollar authorization, such as incorrect credit card information, the zero dollar authorization may indicate a test fail. In response to a test fail (e.g., of the zero dollar authorization or more generally, of the payment transaction test), the profile migration application 140 may generate an error indication and transmit the error indication to the authorized user device 124. In addition to the payment transaction test, the profile migration application 140 may also perform a risk assessment test to determine whether the particular payment profile corresponds to a security risk. For example, the profile migration application 140 may determine a security risk level for the particular payment profile based on credit information associated with the particular payment profile (e.g., credit reports, credit scores, criminal history, and/or the like). In other examples, the profile migration application 140 may determine the security risk level by analyzing other information, such as data from the database 142, data received from querying other sources, and/or data obtained via accessing or scraping publicly information. In a particular implementation, if the profile migration application 140 determines that the security risk level is greater than or equal to a security risk level threshold, the profile migration application 140 may generate a security risk indication and transmit the indication to the authorized user device 124, such as via the web portal application 138. Because the security risk level is greater than or equal to the security risk level threshold, the particular payment profile, the profile migration application 140 determines that the particular payment profile corresponds to a compromised account.

Compromised accounts may, for example, in various embodiments correspond to accounts that have been subject to a security breach, accounts that have been subject to data privacy violations, or accounts that are determined to be utilized for improper means (e.g., money laundering, gambling, and/or other criminal activity).

According to certain embodiments, if the payment transaction test is successful and the profile migration application 140 determines that the security risk level of the particular payment profile is below the security risk level threshold, the profile migration application 140 may generate a new payment profile corresponding to the particular payment profile. Further, the profile migration application 140 may generate the new payment profile according to the second file format. The new payment profile may include new payment information that corresponds to the extracted payment information from the particular payment profile. Further, the new payment information may be associated with the appropriate data fields from the second set of data fields of the second file format. Upon generating the new payment profile, the profile migration application 140 may repeat the same process with respect to each of the remaining payment profiles from the set of payment profiles 120 (e.g., extraction of payment information, performing the payment transaction test, determining a security risk level, and potentially generating a corresponding new payment profile depending on the payment transaction test and the determined security risk level).

The profile migration application 140 may also generate a new set of payment tokens corresponding to the new set of payment profiles 144. For instance, referring to the above example, generating the new payment profile may include generating a new payment token corresponding to the new payment profile. Thus, each new payment profile from the new set of payment profiles may be associated with a corresponding new payment token from the new set of payment tokens. Additionally, the new set of payment tokens may be particular to the migration service provider computer 134 (e.g., computers from other service providers may be unable to use the set of payment tokens) and may enable the merchant device 102 to more securely process payment transactions using the migration service provider computer 134. In certain embodiments, the new set of payment tokens may be generated as part of a successful payment transaction test. For example, the profile migration application 140 may execute the zero dollar authorization with respect to payment information extracted from the particular payment profile. In response to a test pass of the zero dollar authorization, the new payment token may be generated and associated with the new payment profile. The profile migration application 140 may also transmit the new set of payment tokens to the merchant device 102. In some embodiments, each new payment token of the new set of payment tokens may be automatically transmitted to the merchant device 102 in response to a successful payment transaction test.

If the payment transaction test fails or the profile migration application 140 determines that the security risk level of the particular payment profile is greater than or equal to the security risk level threshold, the profile migration application 140 may be configured to pause the profile migration. Additionally, the profile migration application 140 may transmit an error indication (e.g., via the web portal application 138) to the authorized user device 124 indicating that the profile migration has been paused and a reason for the pause (e.g., a test fail of the payment transaction test and/or a security risk level that is too high). The profile migration application 140 may cause the profile migration remain paused until the profile migration application 140 receives an indication (e.g., from the authorized user device 124) to perform a new action with respect to the profile migration. In other embodiments, the profile migration application 140 may not automatically pause the profile migration in response to a test failure of the payment transaction test and/or the risk assessment test. Instead, the profile migration application may generate the error indication and transmit the error indication to the authorized user device 124 and present the authorized user device with a list of available actions to perform in response to the error indication.

For example, the web portal application 138 may cause an interface to be displayed on the authorized user device 124 (e.g., via the web browser 126) that presents a list of actions available with respect to the profile migration in response to the test fail of the payment transaction test or the security risk level being greater than or equal to the security risk level threshold. The actions may include, but are not limited to, pausing the profile migration, resuming the profile migration (e.g. in scenarios where the profile migration application 140 automatically pauses the profile migration), continuing the profile migration with respect to the remaining the payment profiles in the set of payment profiles 120 without generating a new payment profile corresponding to the particular payment profile, or canceling the profile migration for the particular payment profile and the remaining payment profiles in the set of payment profiles 120. The authorized user device 124 may receive a selection (e.g., input by the authorized user) of an action from the list of actions, and the selection may be transmitted to the profile migration application 140 (e.g., via the web portal application 138). In response, the profile migration application 140 may execute, based on the selection, an appropriate corresponding action with respect to the profile migration. According to other embodiments, in response to a payment transaction test failure or the profile migration application 140 determining that the security risk level of the particular payment profile is greater than or equal to the security risk level threshold, the profile migration application 140 may automatically perform one or more of the above listed actions with respect to the profile migration. For example, the profile migration application 140 may automatically continue the profile migration with respect to the remaining the payment profiles in the set of payment profiles 120 without generating a new payment profile corresponding to the particular payment profile.

In certain embodiments, the profile migration application 140 may store the new set of payment profiles 144 on the payment database vault 160. The payment database vault 160 may be a secure database with relatively strict security protocols. The payment database vault 160 may store payment profiles (e.g., the new set of payment profiles 144), payment tokens (e.g., the new set of payment tokens), and/or other types of payment information. The payment database vault 160 may also store relationships and/or mappings between the new set of payment profiles 144 and the new set of payment tokens. Additionally, the payment database vault 160 may be separate from the migration service provider computer 134 (e.g., off-site from the migration service provider computer 134 and/or otherwise not included in the migration service provider computer 134).

Upon completion of the profile migration, the profile migration application 140 may delete, discard, and/or otherwise remove transitional data corresponding to the new set of payment profiles. Transitional data may include copies of the new set of payment profiles 144, copies of the set of payment profiles 120 transferred from the third-party service provider computer, and/or copies of the new set of payment tokens. The transitional data may also include any information corresponding to the new set of payment profiles 144, the set of payment profiles 120 transferred from the third-party service provider computer, the new set of payment tokens, and/or portions thereof (e.g., payment information, metadata, token information, etc.). For example, the profile migration application 140 may remove credit card information, ACH information, checking account numbers, routings numbers, contact information, billing information, and/or any other type of financial account data corresponding to the new set of payment profiles 144 and/or the set of payment profiles 120 transferred from the third-party service provider computer. Thus, sensitive financial account information may be removed from the migration service provider computer 134, which may protect such information from being stolen in case of a potentially breach of the migration service provider computer 134.

As a result of executing the profile migration, the profile migration application 140 generates the new set of payment profiles 144 according to the second file format. According to a particular embodiment, the new set of payment profiles 144 may be stored in the database 142 or any other storage device associated with the migration service provider computer 134. The migration service provider computer 134 may be configured to process future payment transactions between the merchant and customers of the merchant based on the new set of payment profiles 144. Thus, the merchant and/or the merchant device 102 may retain access to payment information of various customers even after switching payment services from the third-party service provider to the service provider.

According to a particular embodiment, the profile migration application 140 may also be configured to determine a progress of the profile migration. For example, the profile migration application 140 may determine the progress of the profile migration based on a comparison between a number of payment profiles of the set of payment profiles 120 that have been analyzed and a total number of payment profiles in the set of payment profiles 120. As another example, the profile migration application 140 may determine the progress of the profile migration based on a number of new payment profiles that have been generated. It will be appreciated that any other algorithm for determining the progress of the profile migration is also contemplated.

The progress information may be transmitted to the authorized user device 124. For instance, upon determining the progress of the profile migration, the web portal application 138 may cause a display interface corresponding to the progress to be displayed by the authorized user device 124 (e.g., via the web browser 126). For example, the display interface may include a progress bar graphic that indicates a completion percentage corresponding to the progress of the profile migration. The display interface may also indicate the number of payment profiles of the set of payment profiles 120 that have been analyzed by the migration service provider computer 134 (e.g., the profile migration application 140). It will be appreciated that the display interface may display any number and any type of indicator corresponding to the progress of the profile migration.

In other embodiments, the merchant may desire to switch payment services from the third-party service provider to another designated service provider that is different from the service provider. As such, the migration service provider computer 134 may be configured to execute a profile migration of the set of payment profiles 120 from the third-party service provider computer 112 to a designated service provider computer of the designated service provider. The migration service provider computer 134 may execute the profile migration similar to the processes describe above. However, the migration service provider computer 134 may generate the new set of payment profiles 144 according to a third file format recognized by a payment processing application of the designated service provider computer. The third file format may be different from the first file format and may include a third set of data fields that is different from the first set of data fields of the first file format. Upon generating the new set of payment profiles 144, the profile migration application 140 may transmit the new set of payment profiles 144 to the designated service provider computer. The designated service provider computer may process future payment transactions between the merchant and customers of the merchant based on the new set of payment profiles 144.

The migration service provider computer 134 may further include a database 142, which may be stored in a memory and/or other storage device of the migration service provider computer 134. The database 142 may include, for example, IDs such as operating system registry entries, cookies associated with the payment processing application 136, the web portal application 138, the profile migration application 140 and/or other applications 116, IDs associated with hardware of the network interface component 146, IDs used for payment/user/device authentication or identification, and/or other appropriate IDs.

In various embodiments, the migration service provider computer 134 also includes at least one network interface component 146 that is configured to communicate with the merchant device 102, the authorized user device 124, and/or the third-party service provider computer 112 via the network 150. For example, according to a particular embodiment, the migration service provider computer 134 may receive, via the network interface component 146, the set of payment profiles 120 from the third-party service provider computer 112. The network interface component 146 may comprise a DSL modem, a PSTN modem, an Ethernet device, a broadband device, a satellite device and/or various other types of wired and/or wireless network communication devices including microwave, RF, and IR communication devices.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 3:
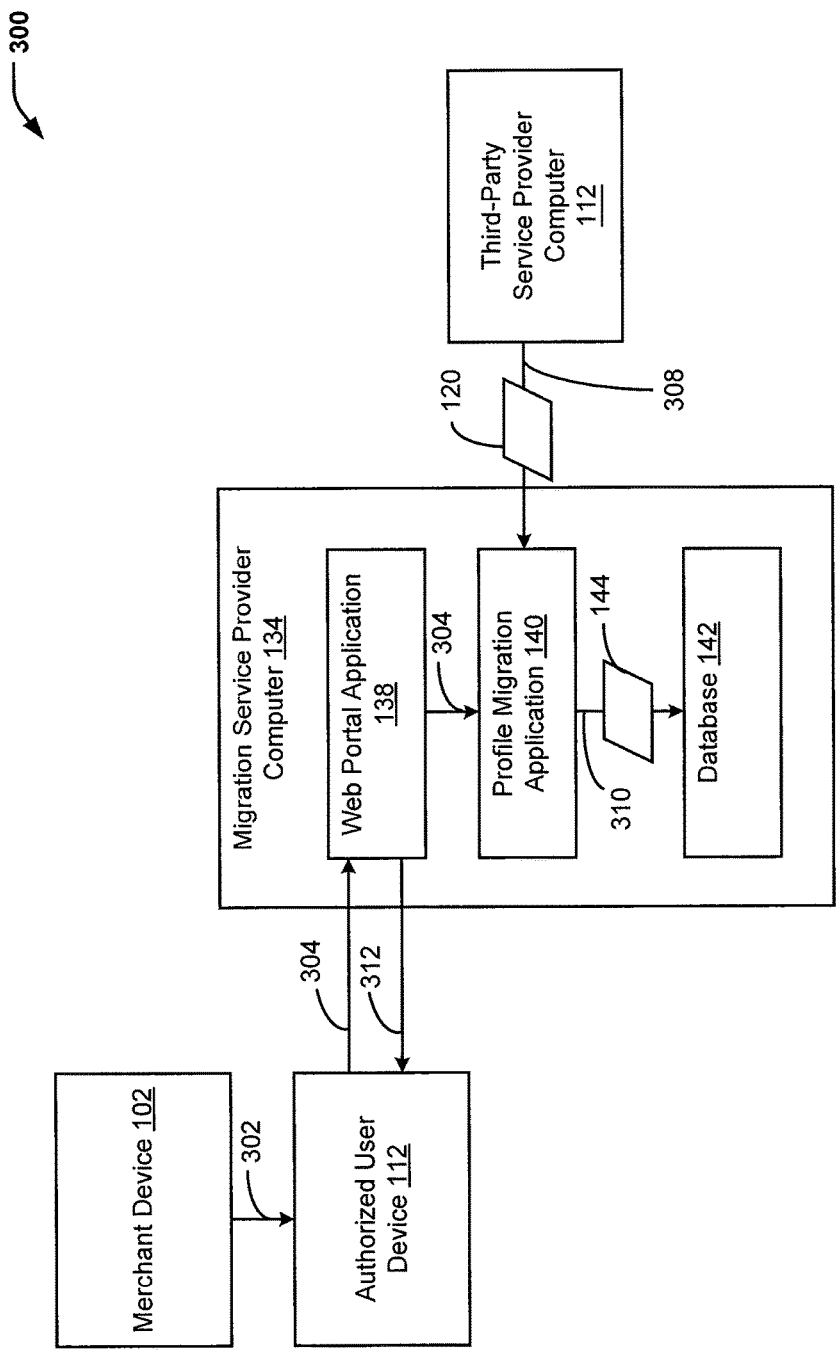
FIG. 3 is an exemplary data flow diagram for payment profile migration, according to an embodiment.

Referring now to FIG. 3, a data flow diagram depicting a data flow 300 between the various components of FIG. 1 is provided in accordance with a particular embodiment. As shown in FIG. 3, the merchant device 102 may transmit a first communication 302 to the authorized user device 124 that instructs the authorized user device 124 to initiate a profile migration of the set of payment profiles 120 from the third-party service provider computer 112 to the migration service provider computer 134. In response to the first communication 302, the authorized user device 124 may transmit a second communication 304 to the migration service provider computer 134. The second communication 304 may include an indication to initiate the profile migration. The second communication 304 may be received by the web portal application 138 and provided to the profile migration application 140. In response to the indication included in the second communication 304, the profile migration application 140 may download 308 the set of payment profiles 120 from the third-party service provider computer 112.

As previously discussed, the set of payment profiles 120 may correspond to a first file format. Based on at least in part on payment information extracted from the set of payment profiles 120, the profile migration application 140 may generate a new set of payment profiles 144 according to a second file format that is different from the first file format. Each payment profile of the new set of payment profiles 144 may correspond to a particular payment profile of the set of payment profiles 120 downloaded from the third-party service provider computer 112. The profile migration application 140 may transmit 310 and/or store the new set of payment profiles 144 in the database 142 or any other storage device associated with the migration service provider computer 134. According to a particular embodiment, the web portal application 138 may also be configured to transmit a third communication 312 to the authorized user device 124. The third communication 312 may include progress information indicating a progress of the profile migration executed by the profile migration application 140.

Figure 4:
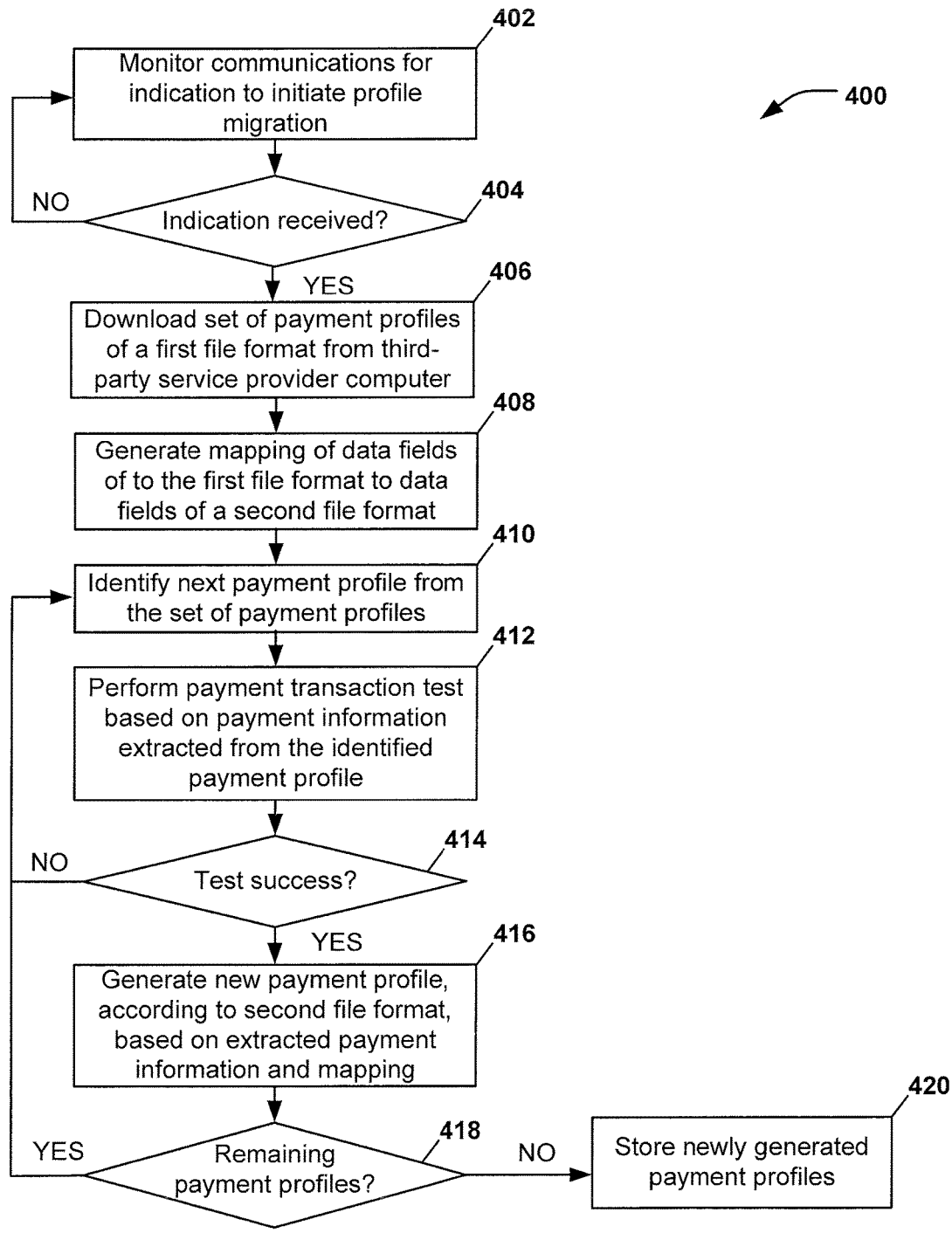
FIG. 4 is an exemplary process flowchart for payment profile migration, according to an embodiment.

Referring now to FIG. 4, a flow diagram of a method 400 for executing a profile migration is provided in accordance with a particular embodiment. Note that one or more steps, processes, and methods described herein may be omitted, performed in a different sequence, or combined as desired or appropriate.

At step 402, a service provider computer, such as the migration service provider computer 134 of FIG. 1 may monitor communications for an indication to initiate a profile migration. For example, the migration service provider computer 134 may monitor, at predetermined intervals, for an indication from the authorized user device 124 to initiate a profile migration between a third-party service provider computer, such as third-party service provider computer 112 of FIG. 1, and the migration service provider computer 134.

At step 404, the migration service provider computer 134 may determine whether the indication has been received. If the indication has not been received, the method 400 may return to step 402 where the migration service provider computer 134 continues to monitor for the indication. If the migration service provider computer 134 determines the indication has been received, the method 400 may continue to step 406.

At step 406, the migration service provider computer 134 may download a set of payment profiles, such as the set of payment profiles 120 of FIG. 1, from the third-party service provider computer 112. As previously discussed, the set of payment profiles 120 may be stored on the third-party service provider computer 112 according to a first file format. The first file format is associated with a first set of data fields that may be used to tag and/or categorize corresponding payment information of each payment profile of the set of payment profiles 120. Additionally, the migration service provider computer 134 may process payment transactions based on payment profiles corresponding to a second file format that is different from the first file format. The second file format is associated with a second set of data fields that are different from the first set of data fields. As such, in order to execute the profile migration, the migration service provider computer 134 may generate a new set of payment profiles, such as the new set of payment profiles 144 of FIG. 1. Each payment profile of the new set of payment profiles 144 may correspond to a particular payment profile from the set of payment profiles 120 downloaded from the third-party service provider computer 112.

At step 408, the migration service provider computer 134 may generate a mapping between the first set of data fields of the first file format and the second set of data fields of the second file format. According to other embodiments, the mapping may have been previously generated and/or otherwise provided to the migration service provider computer 134, and the migration service provider computer 134 may simply access the mapping accordingly.

At step 410, the migration service provider computer 134 may identify a payment profile from the set of payment profiles 120.

At step 412, the migration service provider computer 134 may perform a payment transaction test based on payment information extracted from the identified payment profile. The payment transaction test may be performed to validate the accuracy of the extracted payment information and/or compliance of the extracted payment information with certain regulations (e.g., OFAC regulations). According to a particular embodiment, the extracted payment information may correspond to credit card information. Further, the payment transaction test may be a zero dollar authorization that may be performed via a payment processing application, such as the payment processing application 136 of FIG. 1.

At step 414, the migration service provider computer 134 may determine whether the payment transaction test is successful. If the payment transaction test is not successful, the method 400 may return to step 410, where the migration service provider computer 134 identifies a next payment profile of the set of payment profiles 120 to be analyzed. Further, the migration service provider computer 134 may continue the analysis of the next payment profile without generating a new payment profile corresponding to the previously identified payment profile of the set of payment profiles. If the migration service provider computer 134 determines that the payment transaction test is successful, the method 400 may continue to step 416.

At step 416, the migration service provider computer 134 may generate a new payment profile according to the second file format based on the extracted payment information and the generated mapping. The new payment profile may include new payment information. The new payment information may include similar information to the extracted information, though the new payment information may be categorized according to one or more data fields of the second set of data fields.

At step 418, the migration service provider computer 134 may determine whether there are any remaining payment profiles from the set of payment profiles 120 to be analyzed. If the migration service provider computer 134 determines that there is a remaining payment profile to be analyzed, the method may return to step 410. If the migration service provider computer 134 determines that there are no remaining payment profiles to be analyzed, the method 400 may continue to step 420.

At step 420, the migration service provider computer 134 may store all of the newly generated payment profiles, such as in the database 142 of FIG. 1 or any other storage device.

Figure 5:
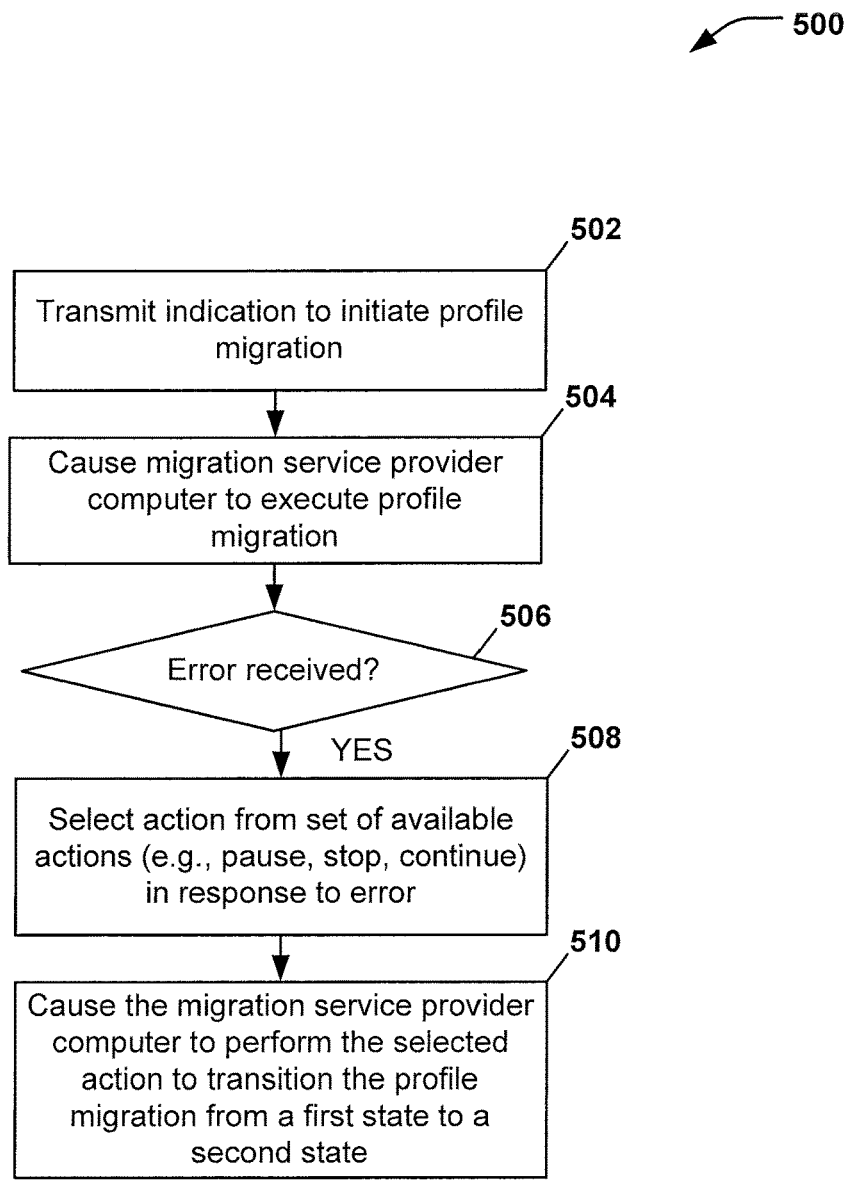
FIG. 5 is an exemplary process flowchart for responding to an error indication of a payment profile migration.

Referring now to FIG. 5, a flow diagram of a method 500 for responding to an error indication of a profile migration is provided in accordance with a particular embodiment. Note that one or more steps, processes, and methods described herein may be omitted, performed in a different sequence, or combined as desired or appropriate.

At step 502, an authorized user computer, such as the authorized user computer 124 of FIG. 1 may transmit an indication to initiate a profile migration. For example, the authorized user computer 124 may transmit an indication to the migration service provider computer 134 to initiate a profile migration between a third-party service provider computer, such as third-party service provider computer 112 of FIG. 1, and the migration service provider computer 134. At step 504, the authorized user device 124 may cause the migration service provider computer 134 to execute the profile migration. For example, the migration service provider computer 134 may execute the profile migration in response to receiving the indication transmitted by the authorized user device 124 at step 502. As previously explained, the migration service provider computer 134 may generate a new set of payment profiles, such as the new set of payment profiles 144 of FIG. 1.

At step 506, the authorized user device 124 may determine if an error indication corresponding to the profile migration has been received. For example, the error indication may correspond to a test fail of a payment transaction test and/or a test fail of a risk assessment test performed by the service provider computer 134 with respect to the set of payment profiles 120 and/or their corresponding payment information.

At step 508, if the authorized user device 124 determines that the error indication has been received, the authorized user device 124 may select an action from a set of available actions in response to the indication. Such actions may include pausing the profile migration, stopping the profile migration, and/or continuing the profile migration. In certain embodiments, one or more of the available actions may be selected in response to an input by the authorized user of the authorized user device 124.

At step 510, the authorized user device 124 may cause the migration service provider computer 134 to perform the selected action and to transition from a first state to a second state. For example, if the selected action corresponds to pausing the profile migration, the selection action may cause the migration service provider computer 134 to transition the profile migration from an active state to a paused state. In certain embodiments, after the profile migration has been paused and the error indication has been resolved, the authorized user device 124 may select a second action (e.g., via input of the authorized user) to resume the profile migration. The authorized user device 124 may therefore cause the service provider computer 134 to resume the profile migration and to transition the profile migration from the paused state back to the active state. As another example, if the selected action is to stop or cancel the profile migration, the selection action may cause the migration service provider computer 134 to transition from an active state to a deactivated state. The deactivated state may result in the service provider computer 134 no longer executing the profile migration and/or the removal of any newly generated payment profiles and/or newly generated payment tokens.

Figure 6:
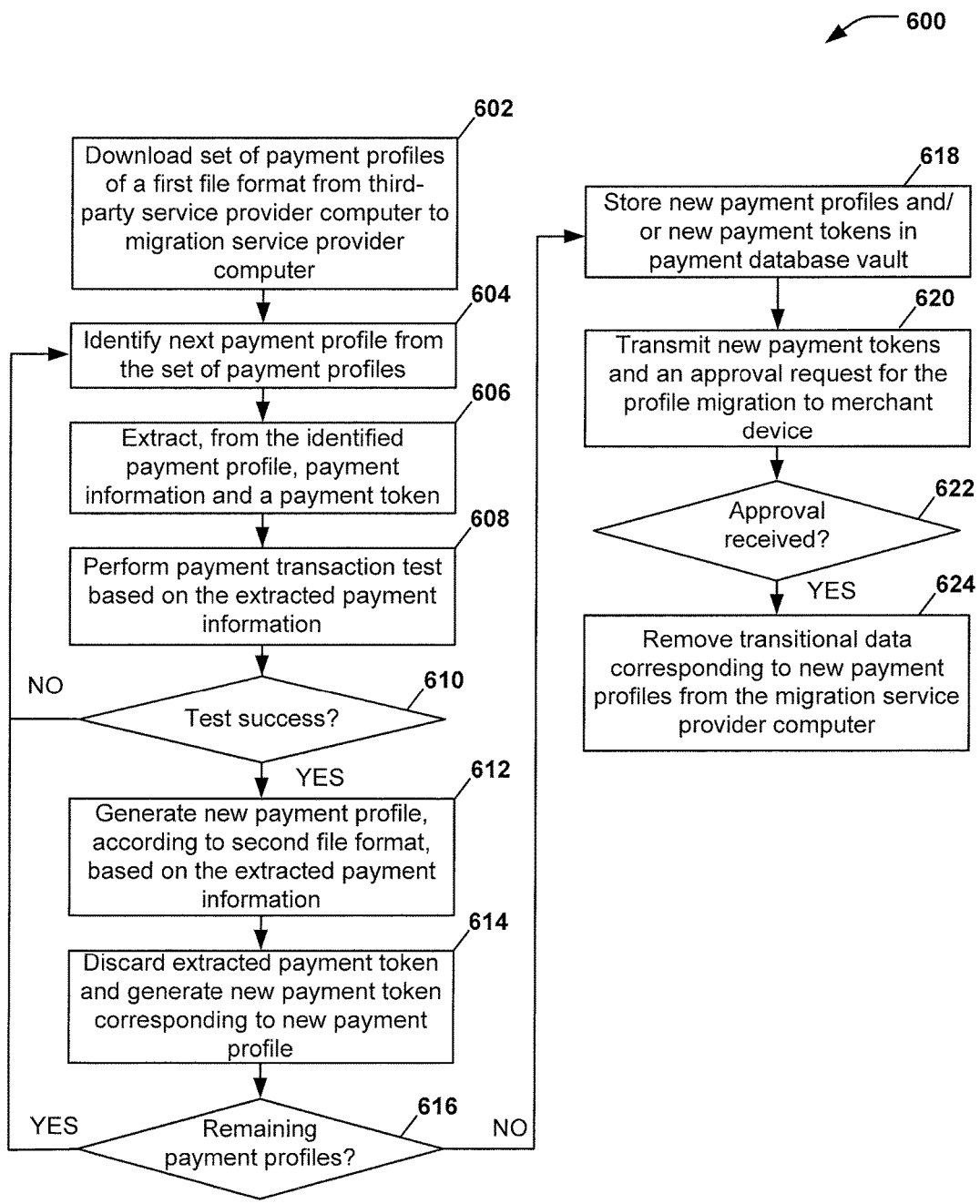
FIG. 6 is an exemplary process flowchart for tokenization with respect to a payment profile migration.

Referring now to FIG. 6, a flow diagram of a method 600 for tokenization with respect to a profile migration is provided in accordance with a particular embodiment. Note that one or more steps, processes, and methods described herein may be omitted, performed in a different sequence, or combined as desired or appropriate. In certain embodiments, the method 600 may be performed with an assumption that a merchant, such as a merchant associated with the merchant device 102 of FIG. 1, desires to transfer a set of payment profiles from the third-party service provider computer 112 to the service provider computer 134.

At step 602, a service provider computer, such as the service provider computer 134 of FIG. 1 may download a set of payment profiles, such as the set of payment profiles 120 of FIG. 1, from the third-party service provider computer 112. As previously discussed, the set of payment profiles 120 may be stored on the third-party service provider computer 112 according to a first file format. Additionally, the migration service provider computer 134 may process payment transactions based on payment profiles corresponding to a second file format that is different from the first file format. The first file format is associated with a first set of data fields that may be used to tag and/or categorize corresponding payment information of each payment profile of the set of payment profiles 120. Additionally, the migration service provider computer 134 may process payment transactions based on payment profiles corresponding to a second file format that is different from the first file format. The second file format is associated with a second set of data fields that are different from the first set of data fields. As such, in order to execute the profile migration, the migration service provider computer 134 may generate a new set of payment profiles, such as the new set of payment profiles 144 of FIG. 1.

At step 604, the migration service provider computer 134 may identify a payment profile from the set of payment profiles 120.

At step 606, the service provider computer 134 may extract, from the identified payment profile, payment information and a payment token. As previously discussed, the third-party service provider computer 112 may store a set of payment tokens corresponding to the set of payment profiles 120. Each payment profile of the set of payment profiles 120 may be associated with a corresponding payment token from the set of payment tokens.

At step 608, the migration service provider computer 134 may perform a payment transaction test based on payment information extracted from the identified payment profile. The payment transaction test may be performed to validate the accuracy of the extracted payment information and/or compliance of the extracted payment information with certain regulations (e.g., OFAC regulations). According to a particular embodiment, the extracted payment information may correspond to credit card information, and the payment transaction test may be a zero dollar authorization that may be performed via a payment processing application, such as the payment processing application 136 of FIG. 1.

At step 610, the migration service provider computer 134 may determine whether the payment transaction test is successful. If the payment transaction test is not successful, the method 600 may return to step 604, where the migration service provider computer 134 identifies a next payment profile of the set of payment profiles 120 to be analyzed. If the migration service provider computer 134 determines that the payment transaction test is successful, the method 400 may continue to step 612

At step 612, the service provider computer 134 may generate a new payment profile according to the second file format based on the extracted payment information. The new payment profile may include new payment information. The new payment information may include similar information to the extracted information, though the new payment information may be categorized according to one or more data fields of the second set of data fields.

At step 614, the service provider computer 134 may discard the extracted payment token and generate a new payment token corresponding to the new payment profile. As previously discussed, the new payment tokens may be particular to the migration service provider computer 134 (e.g., computers from other service providers may be unable to use the set of payment tokens) and may enable the merchant device 102 to more securely process payment transactions using the migration service provider computer 134.

At step 616, the service provider computer 134 may determine whether there are any remaining payment profiles from the set of payment profiles 120 to be analyzed. If the migration service provider computer 134 determines that there is a remaining payment profile to be analyzed, the method may return to step 604. If the migration service provider computer 134 determines that there are no remaining payment profiles to be analyzed, the method 400 may continue to step 618.

At step 618, the service provider computer 134 may store the new payment profiles and/or the new payment tokens in a payment database vault, such as the payment database vault 160 of FIG. 1. As previously discussed, the payment database vault 160 may be a separate from the migration service provider computer 134 and may store payment profiles (e.g., the new set of payment profiles 144), payment tokens (e.g., the new set of payment tokens), and/or other types of payment information.

At step 620, the service provider computer 134 may transmit the new set of payment tokens (e.g., generated from step 604 to step 616) to a merchant device, such as the merchant device 102 of FIG. 1. The service provider computer 134 may also transmit, to the merchant device 102, an approval request corresponding to the profile migration. In certain embodiments, the approval request may include the new set of payment tokens although the approval request and the new set of payment tokens may also be transmitted separately.

At step 622, the service provider computer 134 may determine whether it has received, from the merchant device 102, an approval corresponding to the approval request. If the service provider computer 134 determines that it has received the approval, the method 600 may continue to step 624.

At step 624, the service provider computer 134 may remove transitional data corresponding to the new payment profiles from the service provider computer 134. As previously discussed, the transitional data may include copies of the new set of payment profiles 144, copies of the set of payment profiles 120 transferred from the third-party service provider computer, and/or copies of the new set of payment tokens. The transitional data may also include any information corresponding to the new set of payment profiles 144, the set of payment profiles 120 transferred from the third-party service provider computer, the new set of payment tokens, and/or portions thereof (e.g., payment information, metadata, token information, etc.).

Figure 7:
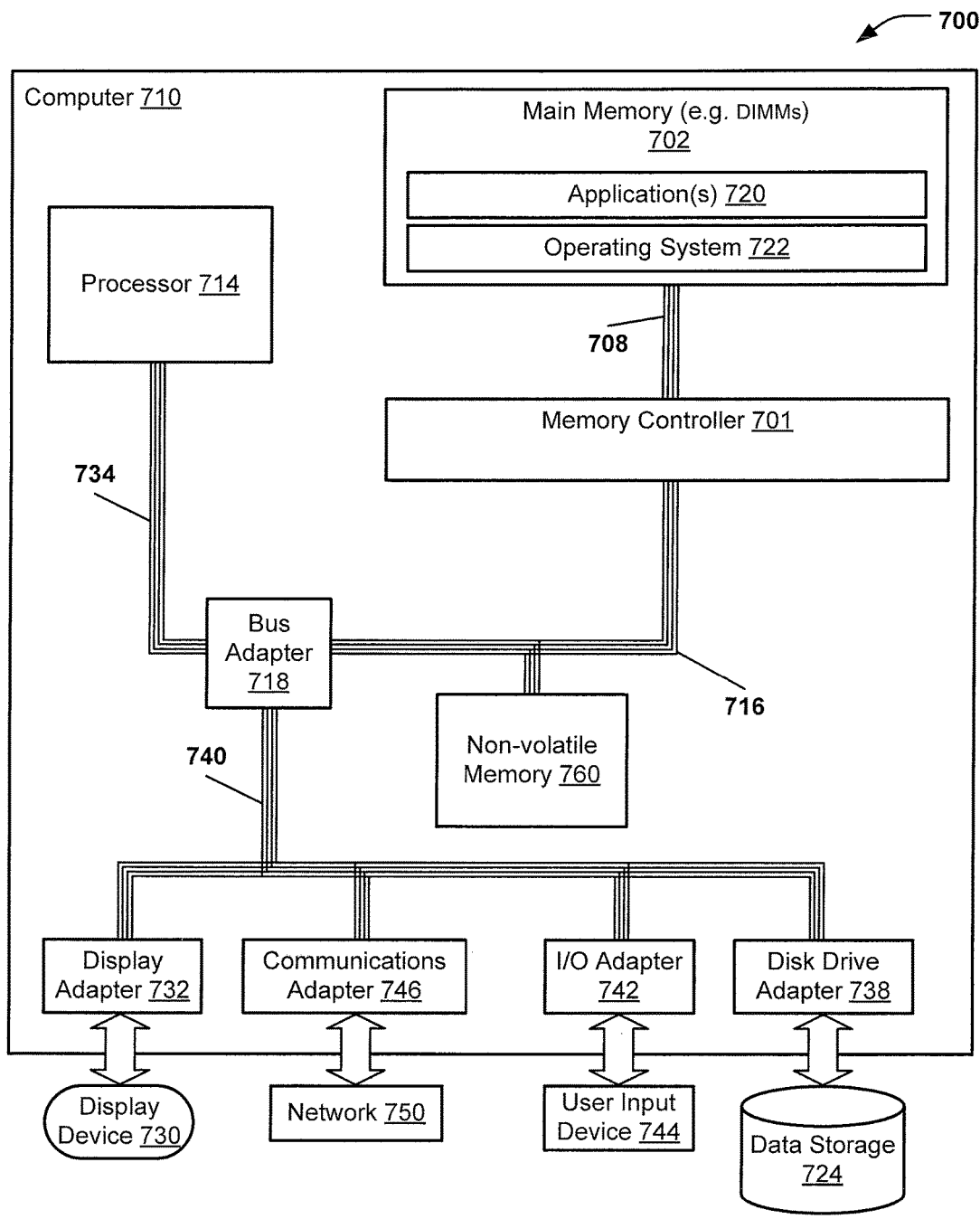
FIG. 7 is a block diagram of a computer system suitable for implementing one or more components in FIG. 1, according to an embodiment.

FIG. 7 is a block diagram of a computer system 700 suitable for implementing one or more components in FIG. 1, according to an embodiment. Referring to FIG. 7, an illustrative system 700 including a computer 710 is shown. The computer 710 may be an implementation of a computing system that includes or corresponds to the merchant device 102, third-party service provider computer 112, authorized user device 124, and/or migration service provider computer 134 of FIG. 1. The computer 710 includes at least one computer processor (CPU) 714 (e.g., a hardware processor) as well as main memory 702, a memory controller 701, and a non-volatile memory 560. The main memory 702 is connected through a memory bus 708 to the memory controller 701. The memory controller 701 and the non-volatile memory 560 are connected through a second memory bus 716 and a bus adapter 718 to the processor 714 through a processor bus 734.

Stored at the memory 702 is one or more applications 720 that may be a module or computer program instructions for carrying out particular tasks (e.g., payment applications 104, payment processing application 114, web browser 126, payment processing application 136, web portal application 138, and/or payment profileA of FIG. 1). Also stored at the main memory 702 is an operating system 722. Operating systems include, but are not limited to, UNIX® (a registered trademark of The Open Group), LINUX® (a registered trademark of Linus Torvalds), WINDOWS® (a registered trademark of Microsoft Corporation, Redmond, Wash., United States), and others as will occur to those of skill in the art. The operating system 722 and the application 720 in the example of FIG. 5 are shown in the main memory 702, but components of the aforementioned software may also, or in addition, be stored at non-volatile memory (e.g., on data storage, such as data storage 724 and/or the non-volatile memory 560).

The computer 710 includes a disk drive adapter 738 coupled through an expansion bus 740 and the bus adapter 718 to the processor 714 and other components of the computer 710. The disk drive adapter 738 connects non-volatile data storage to the computer 710 in the form of the data storage 724 and may be implemented, for example, using Integrated Drive Electronics ("IDE") adapters, Small Computer System Interface ("SCSI") adapters, Serial Attached SCSI ("SAS") adapters, and others as will occur to those of skill in the art. Non-volatile computer memory also may be implemented as an optical disk drive, electrically erasable programmable read-only memory (so-called "EEPROM" or "Flash" memory), RAM drives, and other devices, as will occur to those of skill in the art. In a particular embodiment, the data storage 724 may store the data and information described herein.

The computer 710 also includes one or more input/output ("I/O") adapters 742 that implement user-oriented input/output through, for example, software drivers and computer hardware for controlling input and output to and from user input devices 744, such as keyboards and mice. In addition, the computer 710 includes a communications adapter 746 for data communications with a data communications network 750. The data communications may be carried out serially through Recommended Standard 232 (RS-232) connections (sometimes referred to as "serial" connections), through external buses such as a Universal Serial Bus ("USB"), through data communications networks such as internet protocol (IP) data communications networks, and in other ways as will occur to those of skill in the art. The communications adapter 746 implements the hardware level of data communications through which one computer sends data communications to another computer, directly or through a data communications network. Examples of the communications adapter 746 suitable to use in the computer 710 include, but are not limited to, modems for wired dial-up communications, Ethernet (Institute of Electrical and Electronics Engineers (IEEE) 802.3) adapters for wired network communications, and IEEE 802.11 adapters for wireless network communications. The computer 710 also includes a display adapter 732 that facilitates data communication between the bus adapter 718 and a display device 730, enabling the application 720 to visually present output on the display device 730.

In various embodiments of the present disclosure, execution of instruction sequences to practice the present disclosure may be performed by computer system 700. In various other embodiments of the present disclosure, a plurality of computer systems 700 coupled by communications adapter 746 to the network (e.g., such as a LAN, WLAN, and/or various other wired or wireless networks, including telecommunications, mobile, and cellular phone networks) may perform instruction sequences to practice the present disclosure in coordination with one another.

Particular embodiments described herein may take the form of an entirely hardware embodiment, an entirely software embodiment, or an embodiment containing both hardware and software elements. In a particular embodiment, the disclosed methods are implemented in software that is embedded in processor readable storage medium or storage device and executed by a processor that includes but is not limited to firmware, resident software, microcode, etc.

Further, embodiments of the present disclosure, may take the form of a computer program product accessible from a computer-usable or computer-readable storage device providing program code (e.g., computer-executable instructions) for use by or in connection with a computer, processor, or any instruction execution system. For the purposes of this description, a computer-usable or computer-readable storage device may be non-transitory and can be any apparatus that can tangibly embody a computer program and that can contain, store, communicate, propagate, or transport the program for use by or in connection with the instruction execution system, processor, apparatus, or device.

In various embodiments, the medium can include an electronic, magnetic, optical, electromagnetic, infrared, or semiconductor system (or apparatus or device) or a propagation medium. Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories that may provide temporary or more permanent storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A system, comprising:
   a non-transitory memory; and
   one or more hardware processors coupled to the non-transitory memory and configured to read instructions from the non-transitory memory to cause the system to perform operations comprising:
      receiving an indication to initiate a profile migration of a first set of payment profiles to the system, the first set of payment profiles being stored on a first computer of a first service provider according to a first file format, and each payment profile in the first set of payment profiles comprising data associated with a funding source;
      downloading, from the first computer, the first set of payment profiles and a first set of payment tokens corresponding to the first set of payment profiles;
      performing the profile migration to generate, based on a second file format that is different from the first file format, a second set of payment profiles corresponding to the first set of payment profiles, wherein the performing the profile migration comprises:
         extracting, from a first payment profile of the first set of payment profiles, first data associated with a first funding source;
         validating the first payment profile by performing a transaction using the first funding source; and
         in response to the validating, generating, according to the second file format, a second payment profile corresponding to the first payment profile based on the first data; and
      generating a second set of payment tokens for the second set of payment profiles, wherein the generating the second set of payment tokens comprises generating a second payment token for the second payment profile.

2. The system of claim 1, wherein the indication is received from a merchant device associated with a merchant, and wherein the operations further comprise:
   transmitting, to the merchant device, an approval request corresponding to the profile migration.

3. The system of claim 2, wherein the transmitting comprises:
   generating, based on a result of the profile migration, a report that indicates relationships between the second set of payment profiles and the second set of payment tokens; and
   transmitting the report to the merchant device.

4. The system of claim 2, wherein the operations further comprise:
   receiving, from the merchant device, a second indication indicating an approval of the profile migration; and
   in response to receiving the second indication, removing transitional data corresponding to the second set of payment profiles and the second set of payment tokens from the system.

5. The system of claim 1, wherein the first data comprises at least one of credit card information, automated clearing house information, or financial account information.

6. The system of claim 1, wherein the second payment profile comprises a credit card number, and wherein the second payment token comprises an alphanumeric string that is different from the credit card number.

7. The system of claim 1, wherein the operations further comprise:
  storing the second set of payment profiles in a payment database that is separate from the system; and
  transmitting the second set of payment tokens to a merchant device associated with a merchant.

8. The system of claim 1, wherein the performing the transaction comprises performing a zero dollar authorization based on the first funding source.

9. A method, comprising:
  receiving, by a migration service provider computer comprising one or more hardware processors, a first set of payment profiles that are stored on a third-party service provider computer according to a first file format, wherein the first set of payment profiles is associated with a first set of payment tokens corresponding to the third-party service provider computer;
  performing, by the migration service provider computer, a profile migration for the first set of payment profiles to generate, based on a second file format that is different from the first file format, a second set of payment profiles corresponding to the first set of payment profiles, wherein the performing the profile migration comprises:
    extracting, from a first payment profile of the first set of payment profiles, first data associated with a first funding source;
    performing a transaction using the first funding source;
    validating the first payment profile based on the performing of the transaction; and
    in response to the validating, generating, based on the second file format, a second payment profile corresponding to the first payment profile based on the first data;
  removing the first set of payment tokens from the migration service provider computer; and
  generating, by the migration service provider computer, a second set of payment tokens for the second set of payment profiles.

10. The method of claim 9, further comprising:
  transmitting, to a merchant device associated with a merchant, an approval request corresponding to the profile migration.

11. The method of claim 10, wherein the transmitting comprises:
  generating, based on the profile migration, a report that indicates relationships between the second set of payment profiles and the second set of payment tokens; and
  transmitting the report to the merchant device.

12. The method of claim 10, further comprising:
  receiving, from the merchant device, an indication corresponding to an approval of the profile migration; and
  in response to receiving the indication, removing transitional data corresponding to the second set of payment profiles and the second set of payment tokens from the migration service provider computer.

13. The method of claim 10, wherein the first data comprises at least one of credit card information, automated clearing house information, or financial account information.

14. The method of claim of claim 9, further comprising:
  storing the second set of payment profiles in a payment database that is separate from the migration service provider computer; and
  transmitting the second set of payment tokens to a merchant device associated with a merchant.

15. A non-transitory machine-readable medium having stored thereon machine-readable instructions executable to cause a machine to perform operations comprising:
  receiving an indication to initiate a profile migration of a first set of payment profiles, wherein the first set of payment profiles is stored, according to a first file format, on a first computer of a first service provider, and wherein each payment profile in the first set of payment profiles comprises data associated with a funding source;
  downloading, from the first computer, the first set of payment profiles and a first set of payment tokens corresponding to the first set of payment profiles;
  performing the profile migration to generate, based on a second file format that is different from the first file format, a second set of payment profiles corresponding to the first set of payment profiles, wherein the performing the profile migration comprises:
    extracting, from a first payment profile of the first set of payment profiles, first data associated with a first funding source;
    validating the first payment profile by performing a transaction using the first funding source; and
    in response to the validating, generating, according to the second file format, a second payment profile corresponding to the first payment profile based on the first data; and
  generating a second set of payment tokens for the second set of payment profiles, wherein the generating the second set of payment tokens comprises generating a second payment token for the second payment profile.

16. The non-transitory machine-readable medium of claim 15, wherein the indication is received from a merchant device associated with a merchant, and wherein the operations further comprise:
  transmitting, to the merchant device, an approval request corresponding to the profile migration.

17. The non-transitory machine-readable medium of claim 16, wherein the transmitting comprises:
  generating, based on the profile migration, a report that indicates relationships between the second set of payment profiles and the second set of payment tokens; and
  transmitting the report to the merchant device.

18. The non-transitory machine-readable medium of claim 16, wherein the operations further comprise:
  receiving, from the merchant device, a second indication indicating an approval of the profile migration; and
  in response to receiving the second indication, removing transitional data corresponding to the second set of payment profiles and the second set of payment tokens from the machine.

19. The non-transitory machine-readable medium of claim 15, wherein the first data comprises at least one of credit card information, automated clearing house information, or financial account information.

20. The non-transitory machine-readable medium of claim 15, wherein the operations further comprise:
  storing the second set of payment profiles in a payment database that is separate from the machine; and
  transmitting the second set of payment tokens to a merchant device associated with a merchant.

* * * * *